(12) United States Patent
Mouskis

(10) Patent No.: US 8,226,041 B2
(45) Date of Patent: Jul. 24, 2012

(54) STEERABLE DROGUE

(75) Inventor: Christopher Mouskis, Wimborne (GB)

(73) Assignee: Flight Refuelling Limited, Dorset (GB)

( * ) Notice: Subject to any disclaimer, the term of this patent is extended or adjusted under 35 U.S.C. 154(b) by 183 days.

(21) Appl. No.: 12/742,049

(22) PCT Filed: Nov. 10, 2008

(86) PCT No.: PCT/GB2008/003780
§ 371 (c)(1),
(2), (4) Date: Jul. 20, 2010

(87) PCT Pub. No.: WO2009/060224
PCT Pub. Date: May 14, 2009

(65) Prior Publication Data
US 2010/0282913 A1    Nov. 11, 2010

(30) Foreign Application Priority Data

Nov. 9, 2007   (GB) .................................. 0722060.1

(51) Int. Cl.
*B64D 39/00* (2006.01)
(52) U.S. Cl. .................................................. 244/135 A
(58) Field of Classification Search ............. 244/135 A, 244/1 TD, 3.23, 3.29
See application file for complete search history.

(56) References Cited

U.S. PATENT DOCUMENTS

| | | |
|---|---|---|
| 5,255,877 A | 10/1993 | Lindgren et al. |
| 6,604,711 B1 | 8/2003 | Stevens et al. |
| 7,219,857 B2 * | 5/2007 | Takacs et al. ............. 244/135 A |
| 7,887,010 B2 * | 2/2011 | Takacs et al. ............. 244/135 A |
| 2004/0050998 A1 * | 3/2004 | Edwards ........................ 244/10 |
| 2006/0284019 A1 * | 12/2006 | Takacs et al. ............. 244/135 A |
| 2008/0054124 A1 * | 3/2008 | Takacs et al. ............. 244/135 A |

FOREIGN PATENT DOCUMENTS

| | | |
|---|---|---|
| EP | 0 807 577 A3 | 8/2001 |
| EP | 0 807 577 B1 | 8/2001 |
| EP | 1 736 407 B1 | 9/2009 |
| GB | 2 237 251 A | 5/1991 |
| WO | WO 91/06471 | 5/1991 |
| WO | WO 02/055385 A1 | 7/2002 |
| WO | WO 2006/085986 A1 | 8/2006 |

OTHER PUBLICATIONS

International Preliminary Report on Patentability for PCT/GB2008/003780 dated May 11, 2010 (7 pages).
UK Search Report dated Mar. 5, 2009, for corresponding United Kingdom Application No. GB0820541.1 (1 page).
International Search Report from the European Patent Office mailed Mar. 19, 2009 , in PCT/GB2008/003780.
P.A. Rayment, "In-Flight Refueling Apparatus", Abstract of GB 2237251 dated May 1, 1991.

* cited by examiner

*Primary Examiner* — Timothy D Collins
*Assistant Examiner* — Michael A Fabula
(74) *Attorney, Agent, or Firm* — Finnegan Henderson Farabow Garrett & Dunner LLP

(57) ABSTRACT

A steerable drogue (2) comprises a steering mechanism (22, 34, 36) for twisting the canopy support arms (6) to produce an aerodynamic force in flight which can be used to produce movement of the drogue in a required direction.

18 Claims, 4 Drawing Sheets

STEERABLE DROGUE

TECHNICAL FIELD

This disclosure relates to a steerable drogue for in-flight refuelling.

BACKGROUND

A drogue is commonly attached to a fuel hose which is extended from the refuelling aircraft. It comprises a reception coupling arranged to receive a probe fitted on the receiving aircraft, and a parachute structure for stabilising the drogue and guiding the probe into the coupling. Typically, the parachute comprises a canopy mounted on an array of support arms extending from the coupling.

A difficulty with in-flight refuelling is in aligning the refuelling probe with the drogue. Various ways of controlling the position of the drogue have been suggested, such as the use of movable control surfaces or thrusters. However these tend to be complex and heavy components.

SUMMARY

According to an embodiment, there is provided a steerable drogue for in-flight refuelling comprising a reception coupling for receiving a probe, a canopy carried by a plurality of support arms, and a steering mechanism arranged to selectively alter the configuration of at least one of the support arms such that the support arm(s) produce(s) an aerodynamic force on the drogue in a chosen direction.

Preferably, the steering mechanism is arranged to change the angle of incidence to the air flow of the support arm(s). For example, the support arms may comprise a substantially planar body portion, which extends radially of the drogue. The steering mechanism may be arranged to twist the support arm(s) along the length thereof, away from the radial direction. Preferably the configuration of at least two or more of the support arms is altered; for example a plurality of substantially evenly spaced support arms, or all of the support arms may be altered.

In one convenient arrangement, the steering mechanism is arranged within a reception coupling which mounts the support arms, the mechanism engaging the base of some or each of the support arms. For example, the proximal ends of the arms may pass through an actuating member such as a control ring, the ring being selectively moveable to alter the angle of the support arms to the airflow direction. With this arrangement, the ring may be provided with two motors arranged to move the ring in perpendicular directions in a plane across the drogue, perpendicular to the airflow direction. In this manner, the control ring may be moved in any chosen direction in the plane.

With this arrangement, movement of the control ring produces a change in the angle of each of the support arms which differs progressively according to the position of the support arm around the drogue. Those support arms aligned with the direction of the movement of the ring experience minimum change, and those extending across the direction of movement experience maximum change. This has the effect of producing an aerodynamic force in the direction of movement of the control ring. Thus this arrangement provides a simple steering mechanism.

Where the ring engages with all or many of the support arms, there is a small relative change in the angle of the twist of adjacent arms is small. Thus, the drogue may comprise intercostal members such as tie wires or nets for facilitating the guidance of the probe towards the reception coupling, and alleviating the problem of the probe penetrating between the support arms.

The drogue may also comprise a controller for operating the steering mechanism. The controller may receive information concerning the position or acceleration of the drogue, calculate the required movement of the drogue, and operate the steering mechanism accordingly. For example, the drogue may include accelerometers arranged to measure acceleration of the drogue, and the controller may operate the steering mechanism to stabilise the drogue. Alternatively or in addition, the controller may receive information concerning the relative position of the probe, and operate the steering mechanism to align the drogue with the probe.

An embodiment also relates to the method of steering a drogue as defined above. According to an embodiment, a method of steering a drogue for in-flight refuelling, the drogue having a canopy mounted on the array of support arms, includes selectively altering the configuration of at least one support arm such that the or each support produces an aerodynamic force in a chosen direction.

BRIEF DESCRIPTION OF THE DRAWINGS

In order that the embodiments may be more readily understood, reference will now be made to the accompanying drawings, in which.

DETAILED DESCRIPTION

Figure 1:
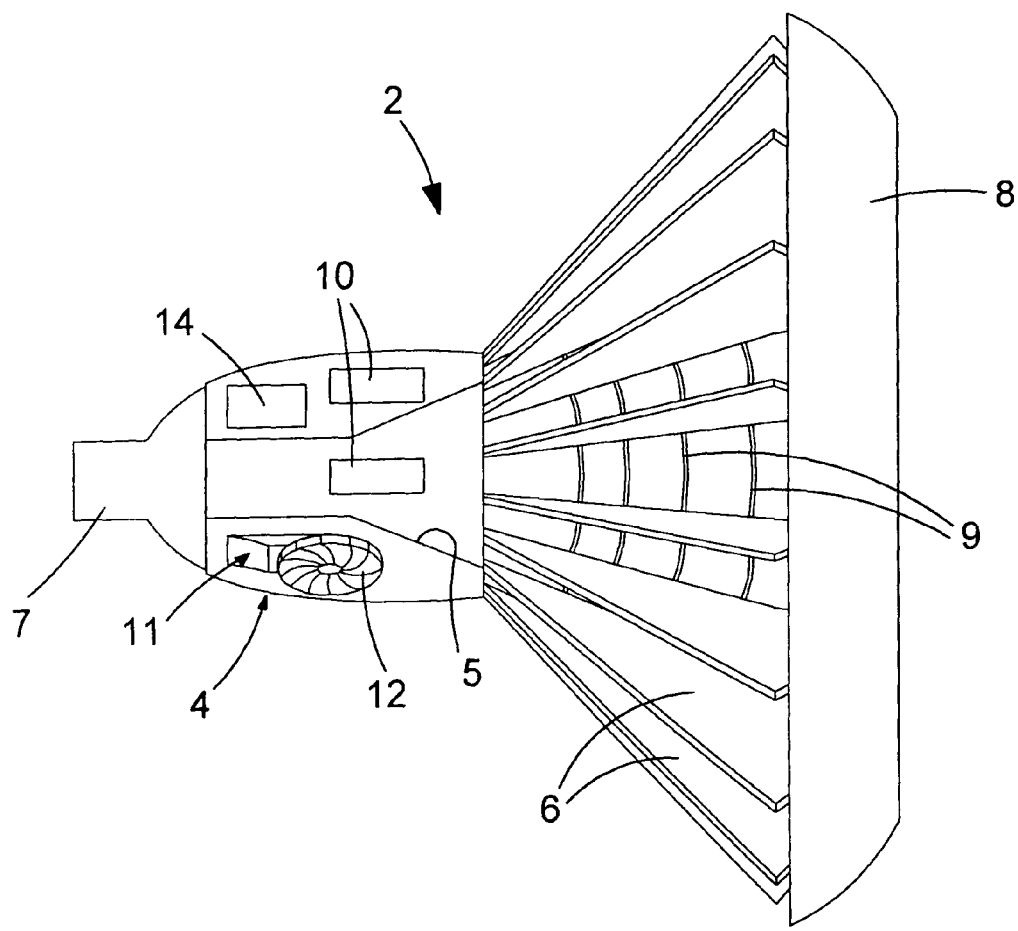
FIG. 1 is a schematic partial cross-sectional side view of a drogue according to one embodiment.

Referring to FIG. 1, a drogue 2 comprises a reception coupling 4 and an array of support arms 6 extending therefrom which support the canopy 8 at the distal ends thereof. The reception coupling 4 includes an internal passage 5 for receiving a refuelling probe, and is attached to a fuel hose 7. The support arms 6 surround the entrance to the probe passage 5 and are each joined to adjacent arms by tie wires 9 for avoiding penetration between the arms by the probe. The arms 6 each have a substantially planar body portion, extending radially of the drogue. As will be described in more detail below, according to an embodiment, the drogue includes a steering mechanism comprising a pair of servo motors 10 mounted in the reception coupling 4 and powered by an air driven turbine generator 11 and flywheel 12. A controller 14 is provided for operating the motors 10.

Figure 2:
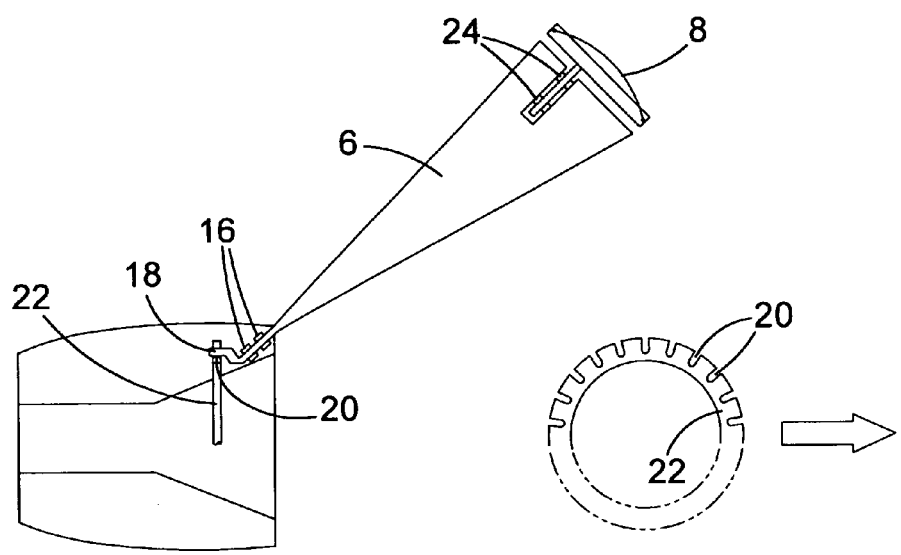
FIG. 2 is a partial schematic side view of the drogue of FIG. 1 showing a front view of the control ring.

Referring now to FIG. 2, each support arm 6 is mounted within the coupling 4 by a pivotal mount 16. The arm 6 has a crank-shaped proximal end 18 engaging a control ring 22. The control ring 22 is mounted substantially coaxially within the reception coupling for translational movement under the action of the servo motors 10. The control ring 22 has an array of slots 20 around the outer edge thereof which receive the cranked ends 18 of the arms 6.

Figure 4:
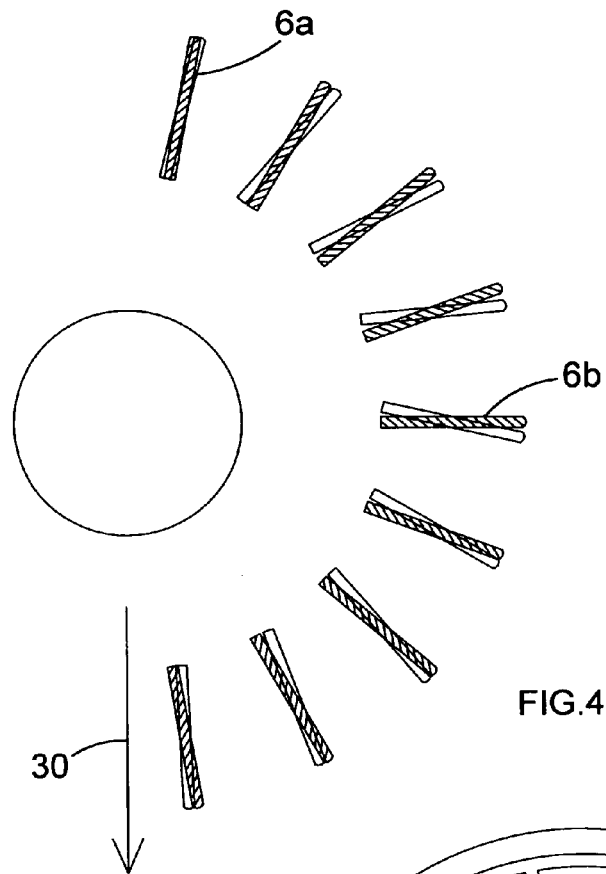
FIG. 4 is a schematic cross-sectional front view of the support arms.

It can be seen that translational movement of the control ring 22 turns the crank 18 of the arm 6 such that the body the arm 6 rotates around is longitudinal axis (see also FIG. 4).

Thus the arm 6 twists with respect to the radial direction. This increases the angle of incidence of the arm 6 to the airflow direction, which is substantially parallel to the longitudinal axis of the drogue 2 in use. Such rotation produces an aerodynamic force in the direction of the translational movement of the control ring 22; i.e. perpendicular to the airflow direction and the axis of the drogue.

The canopy 8 may also be movably mounted by means of a pivotal mount 24 on the distal end of the support arm 6, such that the canopy 8 may maintain its shape despite the twisting movement of the arm 6.

Figure 3:
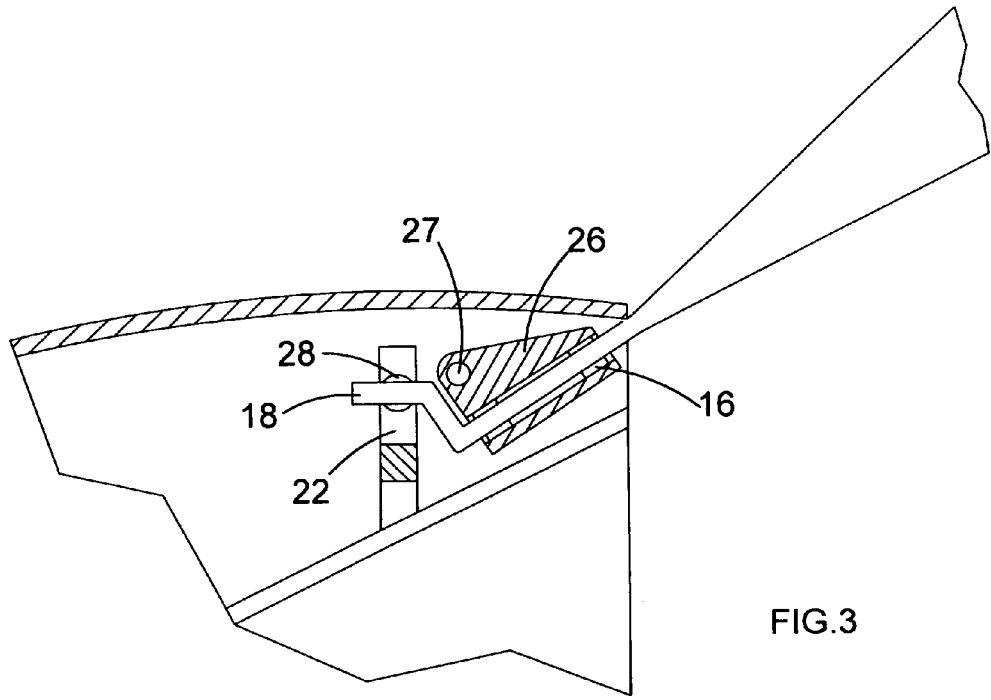
FIG. 3 is an exploded view of part of FIG. 2.

Referring also to FIG. 3, it can be seen that the support arm pivotal mount 16 may be carried by the hinged support 26 which allows the support arm to fold inwardly about a hinge point 27, as is usually required for drogues. A spherical bearing 28 is also provided for the crank end 18 of the arm in the control ring 22 to accommodate misalignment in the ring as the arm rotates.

Some or all of the support arms 6 may be connected to the reception coupling in the manner described above. Referring to FIG. 4, when the control ring is moved in a downward direction in the figure, as shown by the arrow 30, the support arms will move from a position shown shaded, to a position shown below and unshaded. The maximum twisting displacement takes place in the arms (e.g. 6b) which are oriented across the direction of ring movement. Minimum twisting displacement occurs to the arms (e.g. 6a) oriented close to the direction of ring movement 30. The movement provides progressive change in the twisting deflection between the extremes 6b and 6a. The effect of this is to produce an aerodynamic force, in use, in the same downward direction 30 as the direction of control ring movement. Furthermore, the relatively small change in twist angle between adjacent arms means that it remains possible to join these with tie wires 9 or net.

Figure 5:
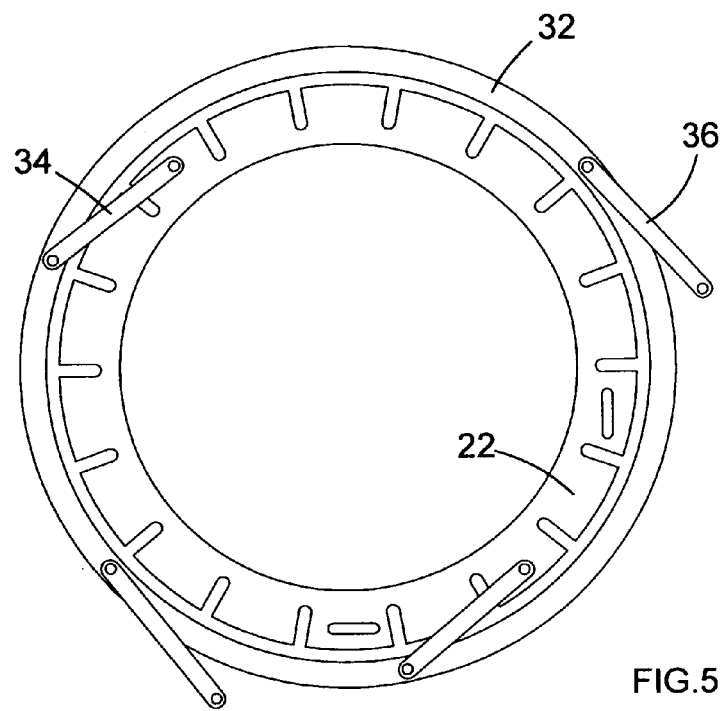
FIG. 5 is a further schematic front view of the control ring and reception coupling.

FIG. 5 illustrates a mounting arrangement for the control ring 22. The control ring 22 is mounted to an intermediate ring 32 by means of a first pair of opposed hinged struts 34. The intermediate ring 32 in turn is connected to the reception coupling by a second pair of opposed hinged struts 36. It will be recognised that such an arrangement allows translational movement of the controlling ring 22 within the reception coupling 4, without allowing rotational movement thereof.

Figure 6:
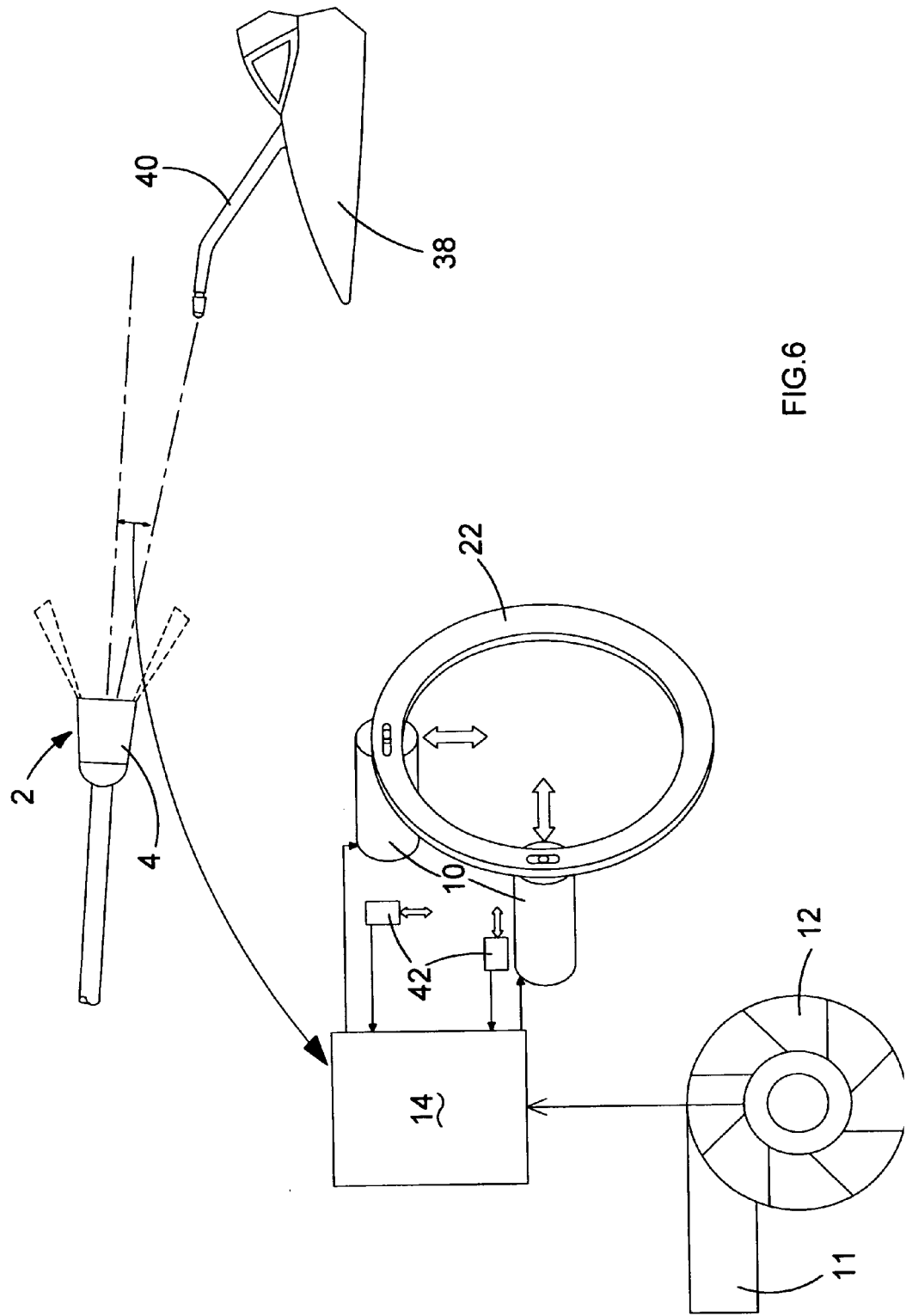
FIG. 6 is a flow diagram of a method of controlling the drogue of FIG. 1.

Referring now to FIG. 6, an aircraft to be refuelled 38 has a refuelling probe 40 which is to be inserted in the reception coupling 4 of the drogue 2. The controller 14 receives information concerning the position of the probe in relation to the drogue axis. The turbine generator 11 is mounted in the reception coupling so as to be operated by the air flow. The controller drives the servo motors 10 using power from the turbine generator 11. The motors are driven by the required amount to cause movement of the control ring and thus the drogue towards the required position. Thus drogue "homes in" on the probe.

As the control of the ribs may demand significantly peak power, a flywheel 12 is provided in the shaft. The flywheel 12 is sized so as to store sufficient kinetic energy to meet peak power requirements. In particular when aerodynamic forces and mechanical friction are taken into account, a peak occurs with high aero loads at maximum rotational speed of the support arms. However, in general, the power requirement will be less than this peak. Thus the flywheel enables the turbine and generator to be sized to meet the average power demand.

Alternatively or in addition, the drogue can be stabilised using a pair of accelerometers 42 provided on perpendicular axes. The controller then uses information from the accelerometers 42 to provide restoring forces via the motors 10.

The invention claimed is:

1. A steerable drogue for in-flight refuelling comprising:
    a reception coupling for receiving a probe,
    a canopy carried by a plurality of support arms, and
    a steering mechanism arranged to selectively alter the configuration of at least one of the support arms such that the at least one support arm produces an aerodynamic force on the drogue in a chosen direction, the steering mechanism being arranged to selectively twist the at least one support arm substantially about an axis along its length.

2. A steerable drogue as claimed in claim 1, in which the steering mechanism is arranged to selectively change the angle of incidence to the air flow of at least a part of the at least one support arm.

3. A steerable drogue as claimed in claim 1, in which the at least one support arm comprises a plurality of spaced support arms, or all of the support arms.

4. A steerable drogue as claimed in claim 3, in which the steering mechanism is arranged to select the amount of alteration of the configuration of the at least one support arm dependent upon the position of the at least one support arm around the drogue and the chosen direction.

5. A steerable drogue as claimed in claim 3, in which the steering mechanism is arranged to impart an amount of alteration to each support arm which varies progressively around the drogue.

6. A steerable drogue as claimed in claim 1, in which the steering mechanism is arranged within the reception coupling, and in which the steering mechanism engages the at least one support arm.

7. A steerable drogue as claimed in claim 6, in which the steering mechanism comprises a moveable actuator engaging the base of the at least one support arm.

8. A steerable drogue as claimed in claim 7, in which the actuator comprises an annular member and a movement mechanism arranged to move the annular member in a plane that is perpendicular to the airflow.

9. A steerable drogue as claimed in claim 8, in which the movement mechanism is arranged to move the annular member in the chosen direction.

10. A steerable drogue as claimed in claim 1, comprising intercostal members between each adjacent pair of support arms.

11. A steerable drogue as claimed in claim 1, comprising a controller for operating the steering mechanism.

12. A steerable drogue as claimed in claim 11, comprising an accelerometer arranged to measure acceleration of the drogue, the controller being arranged to operate the steering mechanism in response to the measured acceleration to stabilise the drogue.

13. A steerable drogue as claimed in claim 11, comprising a measuring device configured to measure the relative position of the probe, the controller being arranged to operate the steering mechanism in response to the measured position to align the drogue with the probe.

14. A steerable drogue as claimed in claim 11, comprising a calculator arranged to calculate the required movement of the drogue.

15. A method of steering a drogue for in-flight refuelling, the drogue having a reception coupling for receiving a probe, and a canopy mounted on an array of support arms, the method comprising:
    altering the configuration of at least one support arm such that the at least one support arm produces an aerodynamic force in a chosen direction, wherein altering the configuration of the at least one support arm includes controlling a steering mechanism to selectively twist the at least one support arm substantially about an axis along its length.

16. A steerable drogue for in-flight refuelling comprising:
a reception coupling for receiving a probe;
a plurality of support arms pivotably mounted to the reception coupling;
a canopy carried by the plurality of support arms; and
a steering mechanism configured to alter an angle of rotation of at least one of the support arms about a longitudinal axis thereof.

17. The steerable drogue of claim 16, wherein the at least one support arm exhibits an angle of rotation that is greater than an angle of rotation of another one of the plurality of support arms.

18. The steerable drogue of claim 17, wherein:

the steering mechanism includes an annular member including a plurality of slots for receiving proximal ends of the plurality of support arms;

the annular member is movable translationally such that the at least one support arm is aligned substantially perpendicularly to the direction of movement of the annular member and the other one of the plurality of support arms is substantially aligned with the direction of movement of the annular member.

* * * * *